June 22, 1965  S. S. KINTIGH  3,190,609
CONTROL DEVICES
Filed May 16, 1962  2 Sheets-Sheet 1
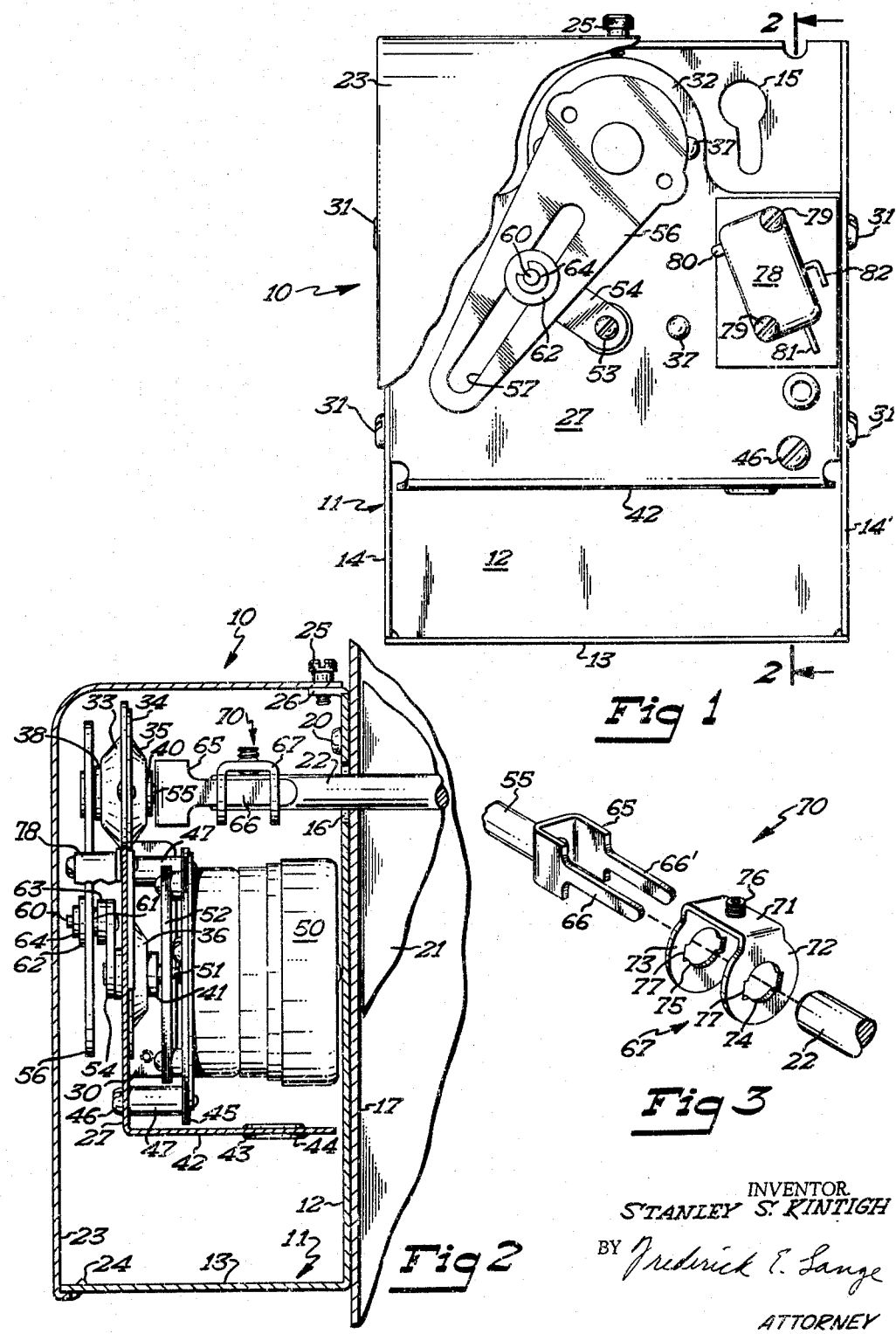
INVENTOR.
STANLEY S. KINTIGH
BY Frederick E. Lange
ATTORNEY

3,190,609
CONTROL DEVICES
Stanley S. Kintigh, Hopkins, Minn., assignor to Honeywell Inc., a corporation of Delaware
Filed May 16, 1962, Ser. No. 195,270
12 Claims. (Cl. 251—134)

This invention relates to an operator for a fluid flow control device. More particularly, my invention is directed to a very compact operator for oscillating a damper or other flow control device between open and closed positions to control the flow of fluid through a conduit.

Fluid flow control devices must often be located where there is a minimum space allowable for mounting an operator for the control. This is particularly true when the control is to be used in ducts or conduits for controlling the flow of a temperature conditioning fluid such as where the operator is used to control a damper in an air duct. With an ever increasing number of homes and other buildings having zone controlled temperature conditioning systems, there is an even greater demand for a compact operator which can be mounted directly on the fluid duct and which is small enough so that it may be positioned in an out-of-the-way and inconspicuous place. In such systems it is often desirable to mount a damper operator on top of an air duct and between floor joists or other structural members of the building. In mounting such a control device, it is desirable, if not absolutely necessary, that there be not only adequate room for mounting the device, but also that provision be made so that the device may be serviced after installation.

Numerous operators for dampers and other flow control devices have been proposed in the past. Many of these are large in size and often having protruding arms for connecting the driving means to the control member. This is particularly true where the device must contain not only the driving motor and associated mechanism but also switching means for its own control and for an external load such as for energizing a fuel control valve or a heat pump. Therefore, many previous devices have been unsatisfactory for use in installations wherein only a minimum amount of space is available, for example in zone controlled air conditioning systems as described previously.

My invention provides a very compact operator for a damper or other flow control device which contains a driving motor and gear train, switching means for controlling the motor, mechanism for reciprocating or oscillating the flow control device between open and closed positions, and switching means for controlling energization of a heating or cooling device when the flow control member is in an open position. My invention provides an operator as described above wherein the components are arranged so as to occupy a minimum amount of space and thus be particularly adaptable for use in systems where there is a minimum amount of space for mounting the operator. In addition, I have provided an operator of the type described which is extremely simple in construction and relatively inexpensive and which is yet extremely reliable in operation and which provides easy access for service after installation.

Therefore an object of my invention is to provide a compact operator for a fluid flow control device.

Another object of my invention is to provide a compact operator for oscillating a damper or other fluid flow control device between open and closed positions in a fluid conduit.

Another object of my invention is to provide an operator as previously described which is adapted to be mounted directly on a fluid conduit and having all of the operating members located within the operator case and the conduit and wherein the components are arranged so as to form an extremely compact unit adaptable for use in locations offering only a limited space for said operator.

Another object of my invention is to provide a compact operator for a damper or other fluid flow control device which provides a relatively fast movement of the control device from closed to open position and a slower movement from open to closed position.

A further object of my invention is to provide a compact operator for oscillating a fluid flow control device as described above and including means for energizing an electrical circuit to a heating or cooling device for the fluid being controlled when said flow control device is in one of its positions and for de-energizing the heating or cooling device when said flow control device is in the other of its positions.

Still another object of my invention is to provide a compact operator for a damper or other fluid flow control device as described above which is simple and relatively inexpensive and yet extremely reliable in operation.

These and other objects of my invention will become apparent upon reading the following detailed description of a preferred embodiment of my invention in conjunction with the accompanying drawing wherein:

FIGURE 1 is a plan view of my invention with the cover partially broken away.

FIGURE 2 is a transverse cross-sectional view taken along line 2—2 of FIGURE 1.

FIGURE 3 is an exploded view of a universal lost motion connecting means as used in my invention for connecting the operator to a flow control member.

Figure 4:
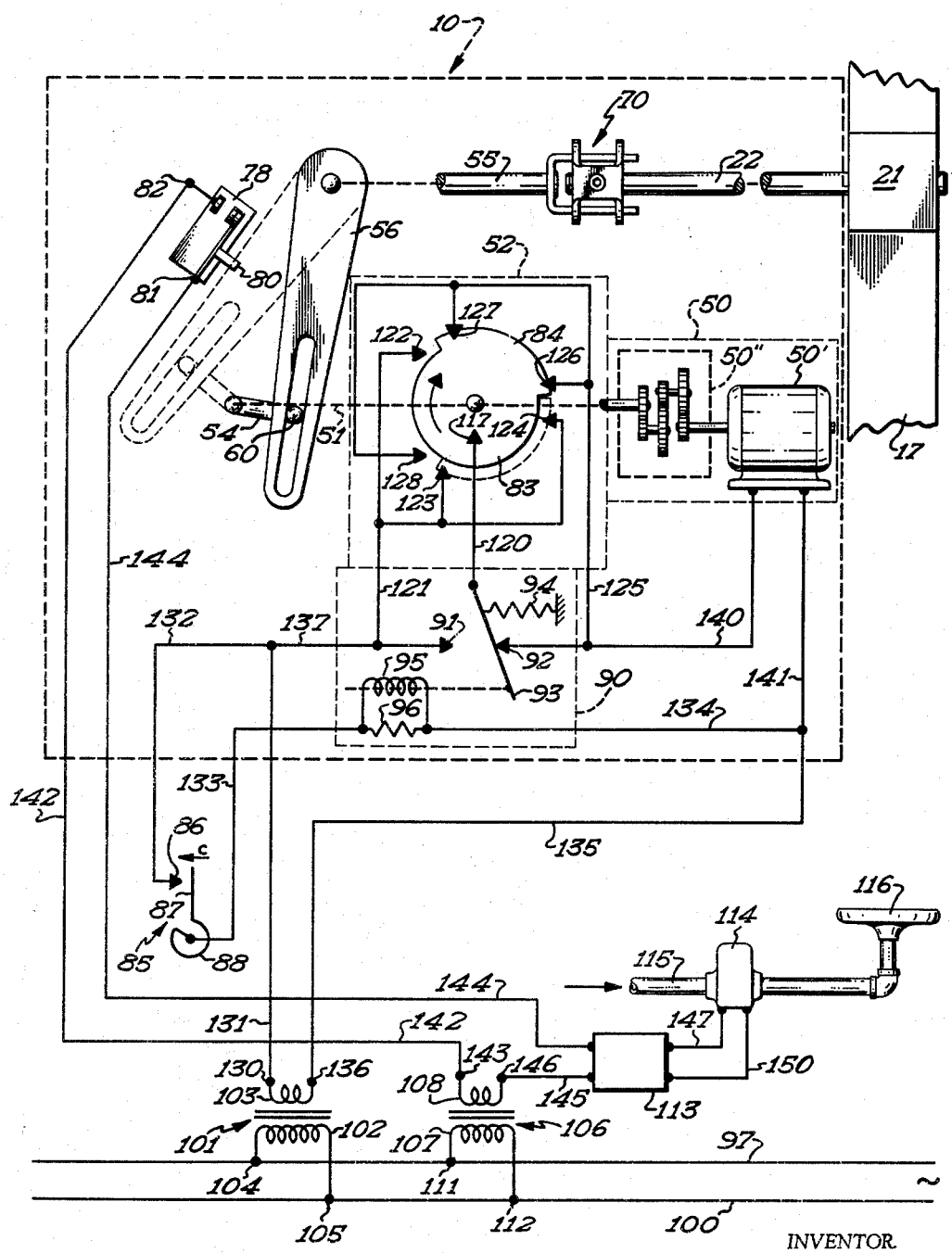
FIGURE 4 illustrates schematically a temperature control system wherein my operator is utilized for controlling a damper in a duct in a forced air system and for controlling energization of a fuel valve in the system.

Referring to FIGURES 1 and 2, the reference numeral 10 generally designates a damper operator constructed according to my invention and which is particularly adapted to be used for operating a damper in a forced air temperature conditioning system. Operator 10 is mounted in a case 11 which may be formed of sheet metal or other appropriate material. Case 11 includes a base or wall 12, an end wall 13 and a pair of side walls 14 and 14'. Base 12 is adapted to be attached directly to an air duct and has a pair of key slots 15, one of which is shown in FIGURE 1. Base 12 also has an aperture 16 formed therein for allowing a damper operating rod to pass therethrough and into the interior of the operator case.

FIGURE 2 shows the damper operator mounted on an air duct 17 by appropriate means such as sheet metal screws 20 which pass through the key hole slots 15. The broken away portion of air duct 17 which is shown in FIGURE 2 contains a damper 21 a portion of which is also shown in FIGURE 2. Damper 21 has an operating rod 22 which is mounted in the duct and which extends through aperture 16 in base 12 and into the interior of the case.

While operator 10 is shown in FIGURES 1, 2 and 4 mounted on the side of an air duct, it is to be understood that it may be mounted in any desired position. For example, in many installations, it may be preferable to have the operator mounted on top of a duct wherein the damper operator rod is mounted in a vertical position.

Case 11 also includes a cover member 23 which is removably hinged to end wall 13 at 24 and which is held in place by a screw 25 which passes through a slot in cover 23 and is threaded into an upwardly extending portion 26 of base 12.

A plate member 27 having flanges 30 which are bent perpendicular to the plate, is mounted within the case in a spaced parallel relationship with base 12. Plate 27 is mounted within case 11 by screws 31 or other appropriate means which pass through side walls 14 and 14' and are threaded into the flange portions 30 of the plate 27. Plate 27 further includes a substantially semi-circular extending portion 32, best shown in FIGURE 1, extending from one end thereof and having a diameter substantially smaller than the width of plate 27. Plate 27, at extension 32, has an outwardly struck frustro-conical portion 33 extending away from base 12 of the case. Another plate 34 has a pair of similarly outwardly struck frustro-conical portion 35 and 36. Plate 34 is mounted on plate 27 by rivets 37 and is positioned so that the frustro-conical portions 35 and 36 extend therefrom in a direction towards wall 12 of the case. Plate 34 is further positioned so that frustro-conical portion 35 extends opposite to similar portion 33 on plate 27. Portions 33 and 35 are apertured and provide spaced apart surfaces for retaining a pair of bearing members 38 and 40. Frustro-conical portion 36 is also apertured and receives a bearing 41 extending through portion 36 and through plate 27.

Plate 27 may also include a perpendicularly extending portion 42 having an aperture 43 which is adapted to receive an insulating grommet 44 which may be utilized to position and retain electrical wiring within the case. To effect greater clarity, all electrical wiring has been deleted from FIGURES 1 and 2 but is shown schematically in FIGURE 4 and will be discussed hereinafter in connection with the figure.

A second plate 45 is mounted on plate 27 by screws 46 and spacers 47. Thus, plate 45 is positioned between and in a spaced, substantially parallel relationship with both plate 27 and base 12. Mounted on plate 45 and adjacent base 12 is a uni-directional electric motor and gear train 50 having an output shaft 51 extending in a direction away from base 12. Also mounted on plate 45, between plates 45 and 27, is a wafer switch 52 which will be described in greater detail in connection with FIGURE 4. Wafer switch 52 is co-axial with output shaft 51 and has a plurality of contacts fixed with respect to plate 45 and movable contact means which cooperates therewith and which is driven by output shaft 51.

After passing through wafer switch 52, output shaft 51 extends through bearing 41 and thus extends outward beyond plate 27. Mounted at the outermost end of shaft 51, by a screw 53, is a crank arm 54 which is secured to shaft 51 so as to be driven thereby.

Mounted in bearings 38 and 40, which are positioned in the frustro-conical sections 33 and 35, is an operating shaft 55. Operating shaft 55 extends substantially parallel to the output shaft 51 of motor and gear train 50. Mounted on shaft 55 at its end farthest away from base 12, is an operating lever 56 which may be attached to shaft 55 by soldering or other appropriate means. Lever 56 has an elongated slot 57 formed therein.

Crank arm 54 has at its outer end, a driving pin 60 which extends through slot 57 of lever 56. Pin 60 may be surrounded by a sleeve 61 of Teflon or other suitable material which engages the edges of slot 57. A pair of washers 62 and 63 may be placed on pin 60 at opposite ends of sleeve 61 and the entire assembly may be held together by a snap washer 64.

The effective length of crank arm 54, the length of slot 57, and the distance between the centers of rotation of crank 54 and operating shaft 55 are such that a complete rotation of output shaft 51 of the uni-directional motor results in oscillation of lever 56 from a first to a second position and then back to the first position. For example, in FIGURE 1, the components are shown in a position which would result in the damper member being in a closed position. Rotation of crank arm 54 in a clockwise direction, as viewed in FIGURE 1, would result in rotating lever 56 to its other extreme position after about 120° of rotation of crank 54. Further rotation of crank 54 through the remaining 240° of the revolution would result in the return of member 56 to the position shown in FIGURE 1. Thus it will be seen that with the relative dimensions as shown in this preferred embodiment, the time required to oscillate member 56 from a closed to an open position is approximately one-half the time which is required to return the member from the open to the closed position. This result is particularly advantageous in forced air heating systems where it is often desired that the damper be closed rather slowly so as not to trap a quantity of hot air in the ducts. It is, of course, obvious that by changing the length of crank arm 54 and the distance between the centers of rotation of members 54 and 56, a different ratio between the opening and closing time may be obtained.

Attached to shaft 55, adjacent bearing 40 is a U-shaped member 65, as best shown in FIGURE 3, which has a pair of leg members 66 and 66' of reduced width which extend in a direction towards base 12 of the case. Legs 66 and 66' cooperate with a yoke 67 to form a universal lost motion connection means generally designated as 70 for connecting operating shaft 55 to the operating rod 22 of the damper. Yoke member 67 is also generally U-shaped and has a bight portion 71 from which extend two generally circular shaped portions 72 and 73. Circular portions 72 and 73 have formed therein a pair of apertures 74 and 75 respectively for receiving the damper operating rod 22. A set screw 76 is threaded into bight portion 71 of the yoke and may be tightened down against operating rod 22 for holding the operating rod in place in the yoke. Extending from the apertures 74 and 75 are a pair of slots generally designated at 77 for receiving leg portions 66 and 66' of the U-shaped member 65. Slots 77 are formed somewhat larger than leg portions 66 and 66' to provide a limited amount of lost motion therebetween, thus eliminating problems which might be involved should the operating shaft 55 and damper operating rod 22 be slightly misaligned. This might happen if rod 22 is not inserted exactly perpendicular to the walls of duct 17. Also the use of this universal lost motion connection means 70 allows the damper operator to be removed from the duct by simply loosening screws 20 and rotating the operator case in key slots 15 which are arranged symmetrically about aperture 16 in base 12 through which operating rod 22 extends. After a slight rotation of the case with respect to the duct, the operator may be lifted from the duct.

A switch 78 is mounted on plate 27 by screws 79 or other appropriate means and in a position so that a switch actuating member 80 is engaged by lever 56 when lever 56 is moved to the open position. Switch 78 further has a pair of electrical connectors 81 and 82 which may be connected in circuit with an operator for a heating or a cooling device such as an operator for a gas valve. When member 56 moves to the position wherein damper 21 is in an open position, it engages the switch actuating member 80 and thus closes the circuit between members 81 and 82. When member 56 is again moved toward its closed damper position, member 80 is released and opens the circuit between members 81 and 82. This operation will be further described in connection with FIGURE 4.

From the foregoing, it can be seen that my improved damper operator utilizes a substantially U-shaped drive train which results in an extremely compact structure. As pointed out previously, this operator is particularly adaptable to be used where only a minimum amount of space is available, for instance if mounted on an air duct in the basement of a home and between the floor joists or other structural members of the building. The device not only requires only a minimum amount of space for mounting but may be removed for service by simply removing cover member 23 and then loosening screws 20 and rotating the operator slightly and then lifting up from the damper operating rod.

The operation of the device can best be seen by referring to FIGURE 4 wherein it is shown schematically and connected in a forced air heating system. In FIGURE 4, operator 10 is shown mounted on an air duct 17 and operating a damper 21. Damper operator 10, as shown schematically in this view, is identical to that shown in FIGURES 1, 2 and 3 except that certain parts are shown in more detail herein. Motor and gear train 50 is seen to be made up of a uni-directional electric motor 50' and a reduction gear train 50". Output shaft 51 from gear train 50" drives a movable contact plate 83 of wafer switch 52. Contact plate 83 may be constructed of any conducting material and includes a sector 84 of increased diameter. Portion 84 in the preferred embodiment of my invention extends through an arc of about 120°. Output shaft 51 extends through plate 83 and drives crank arm 54 as previously pointed out. Crank arm 54 in turn drives lever member 56 and operator shaft 55.

The system is controlled by a thermostat generally designated at 85 which may be placed at some position remote from the operator to sense the temperature of the area to be conditioned. Thermostat 85 has a fixed contact 86 and a movable contact 87 which is movable in response to warping of a bi-metallic element 88. When the temperature drops to a predetermined value, movable contact 87 is moved into engagement with fixed contact 86. It is to be understood that any conventional two-position thermostat may be used in this system and may include a heat anticipating resistor (not shown) as is well known in the art.

Reference numeral 90 generally designates a conventional two-position relay which is contained within the case of actuator 10 and which was not shown in FIGURES 1 and 2. Relay 90 includes a pair of fixed contacts 91 and 92 and a movable contact arm 93 which is normally held in engagement with contact 92 by a spring 94 or other appropriate means. Contact 93 is moved into engagement with contact 91 upon energization of an electro-magnet 95 which is shown connected in parallel with a current reducing resistor 96.

Reference numerals 97 and 100 refer to a pair of electrical conductors which are adapted to be connected across a source of electrical current such as a normal 110 volt source. Reference numeral 101 generally designates a voltage dropping transformer having a primary coil 102 and a low voltage secondary coil 103. Primary coil 102 is connected to electrical connectors 97 and 100 at 104 and 105 respectively. Reference numeral 106 indicates a similar voltage dropping transformer having a primary coil 107 and a low voltage secondary 108. Primary coil 107 of transformer 106 is similarly connected to conductors 97 and 100 at 111 and 112 respectively.

Reference numeral 113 generally designates a control for a gas or oil valve 114 which controls the flow of fuel through a supply line 115 to a burner 116.

Wafer switch 52, as pointed out previously, includes a movable conducting disc 83 which has a sector of enlarged diameter 84. A fixed contact 117 is connected to movable contact 93 of relay 90 by a conductor 120 and is continually in contact with disc 83 regardless of its position. Connected to contact 91 of relay 90 is a conductor 121 which has connected thereto contacts 122, 123 and 124 of wafer switch 52. These three contacts are positioned concentrically about conductive disc 83 and are displaced from each other by approximately 120°. Connected to contact 92 of relay 90 is an electrical conductor 125 which has connected thereto contacts 126, 127 and 128 of wafer switch 52. These three contacts are similarly arranged concentrically about conductive disc 83 and are also displaced from each other by about 120°. Fixed contacts 122, 123, 124, 126, 127 and 128 of wafer switch 52 are positioned in a circle concentric with disc 83 and having a diameter such that the fixed contacts engage disc 83 at a diameter intermediate the diameter of the smaller portion and the diameter of the larger sector 84. Thus the fixed contacts are engaged by the disc only when sector 84 is adjacent them and are not engaged by the disc during any other period of the rotation of the disc.

With the components in the position as shown in FIGURE 4, the thermostat is satisfied and therefore contacts 86 and 87 are in an open position. Relay contact 93 is engaging fixed contact 92, and disc 83 is in a position so that it is contacted by contact 117 which is constantly in contact with the disc and disc 83 is also contacted by fixed contacts 126 and 127. In this position, there is no completed circuit through the motor and thus the damper operator is in a static position. As shown in the solid lines of this drawing, lever 56 is in a position so as to maintain the damper 21 in a closed position in the duct. Actuating member 80 of switch 78 is not engaged by lever 56 and thus the contacts of switch 78 are open.

Upon a call for heat in the area being controlled, movable contact 87 of the thermostat will engage fixed contact 86. This will establish a completed circuit from a terminal 130 of secondary winding 103 through conductors 131 and 132, contacts 86 and 87 of the thermostat to a conductor 133, coil 95 of relay 90, and through conductors 134 and 135 to terminal 136 on the other side of the secondary coil 103 of transformer 101. Establishment of this circuit energizes relay coil 95, and movable contact element 93 is then drawn away from contact 92 and into engagement with fixed contact 91. This establishes a circuit from secondary coil 103 of transformer 101 through conductors 130 and 137, contacts 91 and 93, conductor 120 to fixed contact 117, conductive disc 83, fixed conductors 126 and 127 to conductors 125 and 140 to the motor and through conductors 141 and 135 back to the other side of secondary winding 103 of transformer 101. Thus motor 50' is energized and causes disc 83 of the wafer switch to rotate in a clockwise direction as viewed in FIGURE 4.

Rotation of disc 83 through a small angular distance in a clockwise direction brings sector 84 into engagement with fixed contact 124. This establishes a holding circuit so that the motor will continue to run to move the damper to an open position regardless of whether or not the thermostat is satisfied during this period of operation. This holding circuit is established from the secondary coil 103 of transformer 101, through conductors 131, 137, 121, contact 124, disc 83, contact 126, and conductors 125, 140, motor 50', and through conductors 141 and 135 to the opposite side of secondary 103. A small amount of additional rotation of disc 83 breaks the contact between fixed contact 127 and sector 84. The motor now continues to operate and will drive disc 83 until sector 84 engages fixed contact 123. Slight additional rotation will bring sector 84 out of contact with fixed contact 126 and will thus break the circuit to the motor if thermostat 85 is still in a closed position and calling for heat. Movement to this position will have caused lever 56 to be moved to the dotted position shown in FIGURE 4 wherein it will have engaged actuating member 80 of switch 78 and will have closed the contacts thereof. Damper 21 is now in an open position in duct 17. Closing of the contacts of switch 78 establishes a circuit from secondary coil 108 of transformer 106 through a conductor 142 which is connected to coil 108 at 143, through connector 82 and the contacts of the switch 78 to connector 81, through a conductor 144 to operator 113 and back through a conductor 145 to a terminal 146 at the other side of secondary 108. Controller 113 may then establish a circuit to valve 114 through conductors 147 and 150. Controller 113 may then cause valve 114 to operate to supply fuel to the burner 116 which in turn causes heating of the air which is passed through duct 17. This heating will then continue as long as thermostat 85 is calling for heat.

The damper has thus reached an open position and disc 83 has rotated to a position where sector 84 engages fixed contacts 123 and 124 as shown in the dotted position in FIGURE 4. The damper will remain in this position until the thermostat ceases to call for heat. When the thermostat is satisfied, and contact 87 breaks from contact 86, coil 95 of relay 90 will be de-energized and movable contact 93 of the relay will be moved into engagement with fixed contact 92. A circuit will then be established from transformer 101 through conductors 131, 137, 121 and contacts 123 and 124, disc 83, contact 117, conductor 120, contacts 93 and 92, conductor 140 to motor 50', and through conductors 141 and 135 back to transformer 101. The motor will thus again be driven in a clockwise direction. Rotation of disc 83 through a short distance will bring sector 84 into engagement with fixed contact 128 and establish a holding circuit so that again, regardless of the position of the thermostat, the motor will continue to run and to drive the damper to a closed position. This holding circuit is established through conductors 131, 137, 121, contact 123, disc 83, contact 128, conductors 125 and 140 to motor 50', and through conductors 141 and 135 to transformer 101.

Further rotation of disc 83 will cause sector 84 to disengage contact 124. Still further rotation of disc 83 will bring sector 84 into contact with fixed contact 122 and will subsequently bring sector 84 out of engagement with contact 123. Sector 84 will subsequently rotate into engagement with contacts 127 and 126. Shortly after engaging contact 126, the sector will break engagement with fixed contact 122 and the circuit will be broken to the motor as long as thermostat 85 remains in an open position.

Shortly after energization of the motor upon the thermostat being satisfied, lever 56 will be moved away from actuating member 80 and will allow the contacts of switch 78 to break and to thus de-energize controller 113 for valve 114, thus causing valve 114 to shut off the supply of fuel to burner 116. Therefore heating of the air in duct 17 is discontinued some time before valve 21 reaches its closed position. This is desirable so that a large quantity of heated air is not trapped in the duct. It will also be noted from the description above, that moving damper member 21 from open to closed position takes approximately twice as long as the time required for moving it from closed to open position.

From the foregoing description of my improved damper operator, it will be seen that I have provided an operator for a damper or other flow control device which is extremely compact and is particularly adapted for use in systems wherein only a limited amount of space is available for mounting such an operator. It is particularly adaptable for use in forced air zone control systems. Also it can be seen from the foregoing description that my improved operator is extremely simple in construction and will be relatively inexpensive to produce but is yet very reliable in operation. Further it provides relatively fast opening and slow closing of the flow control device, a feature which is particularly desirable in forced air heating systems.

While I have described and shown my invention for use in operating a damper in a forced air heating system, it may obviously find application in many systems requiring an operator for dampers, valves or similar devices. Therefore, I do not wish to limit the invention to the preferred embodiment shown herein, but intend that it should be limited only by the scope of the appended claims.

I claim:

1. A compact operator for oscillating flow control member between open and closed positions to control the flow of a temperature conditioning fluid through a conduit comprising: a case having a base adapted to be mounted on a fluid conduit; first and second spaced parallel plates mounted in said case and parallel to said base, said second plate having a portion projecting beyond the end of said first plate; a uni-directional electric motor and gear train mounted on said first plate, said motor being disposed adjacent said base and between said base and said first plate; an output shaft from said gear train extending away from said base and through an aperture in said first plate and journaled in said second plate for rotation with respect thereto; switching means for controlling the energization of said electric motor, said switching means comprising fixed contact means mounted on said first plate and movable contact means co-axial with said output shaft and driven by said output shaft; a crank member driven by said output shaft and having a center of rotation co-axial therewith; an operator shaft journaled in said projecting portion of said second plate and extending substantially parallel to and in the opposite direction from the output shaft of said gear train; an operator lever mounted on one end of said operator shaft adjacent said second plate and having an elongated slot formed therein; a pin member mounted on said crank member and extending through the slot in said operator lever and being in sliding engagement therewith for causing oscillating movement of said operator shaft through approximately 60° between an open and and a closed position upon rotation of said crank member, the relationship of said crank member and said operator lever and their centers of rotation being such that rotation of said crank member through substantially one-third of a revolution rotates said operator shaft from closed to open position and further rotation of said crank through two-thirds of a revolution rotates said shaft in the opposite direction to closed position; a U-shaped member mounted on the other end of said operator shaft, the legs of said U-shaped member extending axially with respect to said operator shaft and toward said base; a yoke member having a pair of slots formed therein for receiving said legs; an aperture in said base adjacent to which said motor is disposed to permit an operating rod to pass therethrough; an aperture in said yoke member for receiving said rod; means associated with said yoke member for securing said rod in said last named aperture; and switch means mounted on said second plate and operable upon movement of said operator lever.

2. A compact operator for oscillating a flow control member between open and closed positions to control the flow of a temperature conditioning fluid through a conduit comprising: a case having one wall adapted to be mounted on a fluid conduit; first and second spaced parallel plates mounted in said case, said second plate having a portion projecting beyond the end of said first plate; a uni-directional electric motor and gear train mounted on said first plate, said motor being disposed adjacent said wall; an output shaft from said gear train extending away from said wall; switching means for controlling the energization of said electric motor, said switching means comprising fixed contact means and movable contact means co-axial with said output shaft and driven by said output shaft; a crank member driven by said output shaft and having a center of rotation co-axial therewith; an operator shaft journaled in the projecting portion of said second plate and extending substantially parallel to the output shaft of said gear train and extending from said second plate in a direction opposite to said output shaft; an operator lever mounted on one end of said operator shaft adjacent said second plate and having an elongated slot formed therein; a pin member mounted on said crank member and being in sliding engagement with said slot for causing oscillating movement of said operator shaft through an acute angle between an open and a closed position upon rotation of said crank member, the relationship of said crank member and said operator lever and their centers of rotation being such that rotation of said crank member through less than 180° rotates said operator shaft from closed to open position and further rotation of said crank through the remainder of a revolution rotates said shaft in the opposite direction to closed position; a member mounted on the other end of said operator shaft and having a plurality of leg members extending axially with respect to said operator shaft and toward said wall; a yoke member having a like plurality of slots formed therein for receiving said legs; an aperture in said wall to permit an operating rod to pass therethrough; a pair of axially aligned apertures in said yoke member for receiving said operating rod; means associated with said yoke member for securing said rod in said pair of apertures, and switch means mounted on said second plate and operable by said operator lever and adapted to be connected in circuit with an external conditioning device.

3. A compact operator for oscillating a flow control device between open and closed positions to control the flow of a temperature conditioning fluid through a conduit comprising; a case having one wall adapted to be mounted on a fluid conduit; first and second spaced parallel plates mounted in said case; a uni-directional electric motor and a gear train mounted on said first plate between said first plate and said wall, an output shaft from said gear train extending away from said wall; switching means for controlling the energization of said electric motor, said switching means comprising fixed contact means mounted on said first plate and movable contact means driven by said output shaft; a crank member driven by said output shaft and having a center of rotation co-axial therewith; an operator shaft journaled in said second plate and extending substantially parallel to the output shaft of said gear train and extending from said second plate in a direction opposite to said output shaft; an operator lever mounted on one end of said operator shaft adjacent said second plate and having an elongated slot formed therein; a pin member mounted on said crank member and slidably engaging the slot in said operator lever for causing oscillating movement of said operator shaft between an open and a closed position upon rotation of said crank member, the relationship of said crank member and said operator lever and their centers of rotation being such that rotation of said crank member through part of a revolution rotates said operator shaft from closed to open position and further rotation of said crank through the remainder of a revolution rotates said shaft in the opposite direction to closed position; a member mounted on the other end of said operator shaft and having a plurality of leg members extending axially with respect to said operator shaft and toward said wall; a yoke member having a plurality of slots formed therein for receiving said legs; an aperture in said wall in alignment with said operator shaft to permit an operating rod to pass therethrough; an aperture in said yoke member adapted to receive the rod; and means associated with said yoke member and adapted to secure the rod in said aperture.

4. A compact operator for oscillating a flow control member between open and closed positions to control the flow of a temperature conditioning fluid through a conduit comprising: a case having one wall adapted to be mounted on a fluid conduit; a uni-directional electric motor and gear train; means mounting said motor and said gear train in said case, said motor being disposed adjacent said wall; an output shaft from said gear train extending away from said wall; switching means for controlling the energization of said electric motor, said switching means comprising fixed contact means and movable contact means co-axial with said output shaft and driven by said output shaft; a crank member driven by said output shaft and having a center of rotation co-axial therewith; an operator shaft rotatably mounted in said case and disposed substantially parallel to the output shaft of said gear train; an operator lever mounted on one end of said operator shaft and having an elongated slot formed therein; a pin member formed on said crank member and being in sliding engagement with said slot for causing oscillating movement of said operator shaft between an open and a closed position upon rotation of said crank member, the effective length of said crank member and the distance between centers of rotation of said crank member and said operator shaft being such that rotation of said crank member through less than 180° rotates said operator shaft from closed to open position and further rotation of said crank through the remainder of a revolution rotates said shaft in the opposite direction to closed position; a member mounted on the other end of said operator shaft and having a plurality of leg members extending axially with respect to said operator shaft and toward said wall; a yoke member having a plurality of slots formed therein for receiving said legs; an aperture in said wall which is adjacent said motor to permit an operating rod to pass therethrough; a pair of apertures in said yoke member for receiving said operating rod; means associated with said yoke member for securing said rod in said apertures.

5. A compact operator for oscillating a flow control member between open and closed positions to control the flow of a temperature conditioning fluid through a conduit comprising: a case having one wall adapted to be mounted on a fluid conduit; first and second spaced parallel plates mounted in said case and parallel to said one wall, said second plate having a portion projecting beyond the end of said first plate; a uni-directional electric motor and gear train mounted on said first plate, said motor being disposed adjacent said wall and between said wall and said first plate, an output shaft from said gear train extending away from said wall and through an aperture in said first plate and journaled in said second plate for rotation with respect thereto; switching means for controlling the energization of said electric motor, said switching means comprising fixed contact means mounted on said first plate and movable contact means co-axial with said output shaft and driven by said output shaft; an operator shaft journaled in said projecting portion of said second plate and extending substantially parallel to the output shaft of said gear train and toward said wall; linkage means operably connecting said output shaft and said operator shaft for causing oscillating movement of said operator shaft between an open and a closed position upon rotation of said output shaft, a U-shaped member mounted on one end of said operator shaft, the legs of said U-shaped member extending axially with respect to said operator shaft and toward said wall; a yoke member having a pair of slots formed therein for receiving said legs; an aperture in said wall adjacent to which said motor is disposed and adapted to permit an operating rod to pass therethrough; a pair of apertures in said yoke member and adapted to receive the rod; means associated with said yoke member for securing said rod in said apertures; and switch means mounted on said second plate and operable upon movement of said linkage means for controlling energization of an external control device.

6. A compact operator for oscillating a flow control member between open and closed positions to control the flow of a temperature conditioning fluid through a conduit comprising: a case having one wall adapted to be mounted on a fluid conduit; a uni-directional electric motor and gear train; means mounting said motor and said gear train in said case, said motor being disposed adjacent said wall; an output shaft from said gear train extending away from said wall; switching means for controlling the energization of said electric motor, said switching means comprising fixed contact means and movable contact means co-axial with said output shaft and driven by said output shaft; a crank member driven by said output shaft and having a center of rotation co-axial therewith; an operator shaft rotatably mounted in said case and disposed substantially parallel to the output shaft of said gear train; means operably connecting said crank member and said output shaft for causing oscillating movement of said operator shaft between an open and a closed position upon rotation of said crank member, the effective length of said crank member and the distance between centers of rotation of said crank member and said operator shaft being such that rotation of said crank member through part of a rotation rotates said operator shaft from closed to open position and further rotation of said crank through the remainder of a rotation rotates said operator shaft in the opposite direction to closed position; a member mounted at one end of said operator shaft adjacent said wall and having a plurality of leg members extending axially with respect to said operator shaft and toward said wall; a yoke member having a plurality of slots formed therein for receiving said legs; an aperture in said wall which is adjacent said motor to permit an operating rod to pass therethrough; an aperture in said yoke member for receiving said operating rod; means associated with said yoke member for securing said rod in said aperture; and switch means mounted in said case and operable by said connecting means between said crank member and said output shaft.

7. A compact operator for oscillating a flow control device between open and closed positions to control the flow of a temperature conditioning fluid through a conduit comprising: a case having one wall adapted to be mounted on a fluid conduit; a uni-directional electric motor and gear train mounted in said case, said motor being disposed adjacent said wall; an output shaft from said gear train extending away from said wall; switching means associated with said output shaft for controlling the energization of said electric motor; a crank member driven by said output shaft; an operator shaft rotatably mounted in said case and extending in substantially parallel relationship to the output shaft of said gear train; an operator lever mounted on said operator shaft and having an elongated slot formed therein; a pin member mounted on said crank member and operably engaging the slot in said operator lever for causing oscillating movement of said operator shaft between an open and closed position upon rotation of said crank member, the relationship of said crank member and said operator lever and their centers of rotation being such that rotation of said crank member through less than a complete revolution rotates said operator shaft from closed to open position and further rotation of said crank through the remainder of a revolution rotates said shaft in the opposite direction to closed position; an aperture in said wall to permit an operating rod to pass therethrough; and means associated with said operator shaft adjacent said wall and adapted to drivingly connect the operating rod thereto.

8. A compact operator for oscillating a flow control device between open and closed positions to control the flow of a temperature conditioning fluid through a conduit comprising: a case having one wall adapted to be mounted on a fluid conduit; a pair of spaced parallel plates mounted in said case; a uni-directional electric motor and gear train mounted on a first of said plates, said motor being mounted adjacent said wall, an output shaft from said gear train extending away from said wall; switching means operable upon rotation of said output shaft for controlling the energization of said electric motor, a crank member driven by said output shaft and having a center of rotation co-axial therewith; an operator shaft rotatably mounted on the second of said plates and extending substantially parallel to the output shaft of said gear train and extending from said plate toward said wall; an operator lever mounted on said operator shaft and having an elongated slot formed therein; a pin member mounted on said crank member and slidably engaging the slot in said operator lever for causing oscillating movement of said operator shaft between an open and a closed position upon rotation of said crank member, the relationship of said crank member and said operator lever and their centers of rotation being such that rotation of said crank member through a portion of a revolution rotates said operator shaft from closed to open position and further rotation of said crank through the remainder of a revolution rotates said shaft in the opposite direction to closed position; an aperture in said wall to permit an operating rod to pass therethrough; and universal lost motion connecting means for drivingly connecting said operating rod and said operator shaft.

9. A compact operator for oscillating a flow control device between open and closed positions to control the flow of a temperature conditioning fluid through a conduit comprising: a case having one wall adapted to be mounted on a fluid conduit; first and second spaced parallel plates mounted in said case; a uni-directional electric motor and gear train mounted on said first plate between said first plate and said wall; an output shaft from said gear train extending away from said wall; switching means associated with said output shaft for controlling the energization of said electric motor; a crank member driven by said output shaft; an operator shaft rotatably mounted on said second plate and extending in spaced substantially parallel relationship to the output shaft to said gear train and extending from said second plate in a direction toward said wall; an operator lever mounted on said operator shaft and having an elongated slot formed therein; a pin member mounted on said crank member and operably engaging the slot in said operator lever for causing oscillating movement of said operator shaft between an open and a closed position upon rotation of said crank member, the relationship of said crank member and said operator lever and their centers of rotation being such that rotation of said crank member through less than a complete revolution rotates said operator shaft from closed to open position and further rotation of said crank through the remainder of a revolution rotates said shaft in the opposite direction to closed position; an aperture in said wall to permit an operating rod to pass therethrough; and means associated with one end of said operator shaft and adapted to drivingly connect the operating rod thereto.

10. A compact operator for oscillating a flow control device between open and closed positions in a fluid conduit comprising: a case having one wall adapted to be mounted on a fluid conduit; first and second spaced parallel plates mounted in said case; a uni-directional electric motor and gear train mounted on said first plate between said first plate and said wall; an output shaft from said gear train extending away from said wall; switching means associated with said output shaft for controlling the energization of said electric motor; a crank member driven by said output shaft; an operator shaft rotatably mounted on said second plate and extending in spaced substantially parallel relationship to the output shaft to said gear train and extending from said second plate in a direction toward said wall; means driven by said crank member and operably connected to said operator shaft for causing oscillating movement of said operator shaft between an open and a closed position upon rotation of said crank member, the effective length of said crank member and the distance between centers of rotation of said crank member and said operator shaft being such that rotation of said crank member through less than a complete revolution rotates said operator shaft from closed to open position and further rotation of said crank through the remainder of a revolution rotates said shaft in the opposite direction to closed position; an aperture in said wall to permit an operating rod to pass therethrough; and means associated with one end of said operator shaft and adapted to drivingly connect the operating rod thereto.

11. A compact operator for oscillating a flow control device between open and closed positions to control the flow of a temperature conditioning fluid through a conduit comprising: a case having one wall adapted to be mounted on a fluid conduit; a uni-directional electric motor and gear train mounted in said case, said motor being disposed adjacent said wall; an output shaft from said gear train extending away from said wall; switching means associated with said output shaft for controlling the energization of said electric motor; an operator shaft rotatably mounted in said case and extending in substantially parallel spaced relationship to the output shaft of said gear train; means driven by said output shaft and operably connected with said operator shaft for causing oscillating movement of said operator shaft between an open and a closed position upon rotation of said output shaft, rotation of said output member through less than a complete revolution rotating said operator shaft from closed to open position and further rotation of said output shaft through the remainder of a revolution rotating said operator shaft in the opposite direction to closed position; an aperture in said wall to permit an operating rod to pass therethrough; a member mounted on said operator shaft and having a pair of spaced leg members extending toward said wall; a yoke member having a bight portion extending generally parallel to said pair of leg members and a pair of spaced parallel portions extending generally perpendicular thereto; a pair of axially aligned apertures, one in each of said portions, to accept the operating rod; set screw means threaded into the bight portion of said yoke and adapted to engage said operating rod to secure it in said apertures; and a pair of diametrically opposed slots co-extensive with each of said apertures and adapted to receive said leg members to provide a driving connection between said operator shaft and said operating rod.

12. A compact operator for oscillating a flow control device between open and closed positions to control the flow of a fluid through a conduit comprising: a case having one wall adapted to be mounted on a fluid conduit; a uni-directional electric motor and gear train mounted in said case, said motor being disposed adjacent said wall; an output shaft from said gear train extending away from said wall; switching means associated with said output shaft for controlling the energization of said electric motor; an operator shaft rotatably mounted in said case and extending in substantially parallel spaced relationship to said output shaft; linkage means operably connecting said output shaft and said operator shaft for causing oscillating movement of said operator shaft between an open and a closed position upon rotation of said output shaft; an aperture in said wall adjacent said motor to permit an operating rod to pass therethrough; and means adapted to provide a flexible driving connection between said operator shaft and said operating rod including a member mounted on said operator shaft and having a pair of leg members extending toward said wall, and a yoke member adapted to be secured to said operating shaft and having a pair of slots to accept said extending leg members.

References Cited by the Examiner

UNITED STATES PATENTS

| 2,668,267 | 2/54 | Chapman | 251—134 X |
| 2,851,648 | 9/58 | Reger | 318—267 |
| 2,977,437 | 3/61 | Doane | 251—134 X |

FOREIGN PATENTS 164,924　1/34　Switzerland.

M. CARY NELSON, *Primary Examiner.*

ISADOR WEIL, *Examiner.*